May 19, 1925.
C. J. McNERNY
1,538,714
FOUR-WHEEL BRAKE MECHANISM
Filed April 7, 1924
2 Sheets-Sheet 1
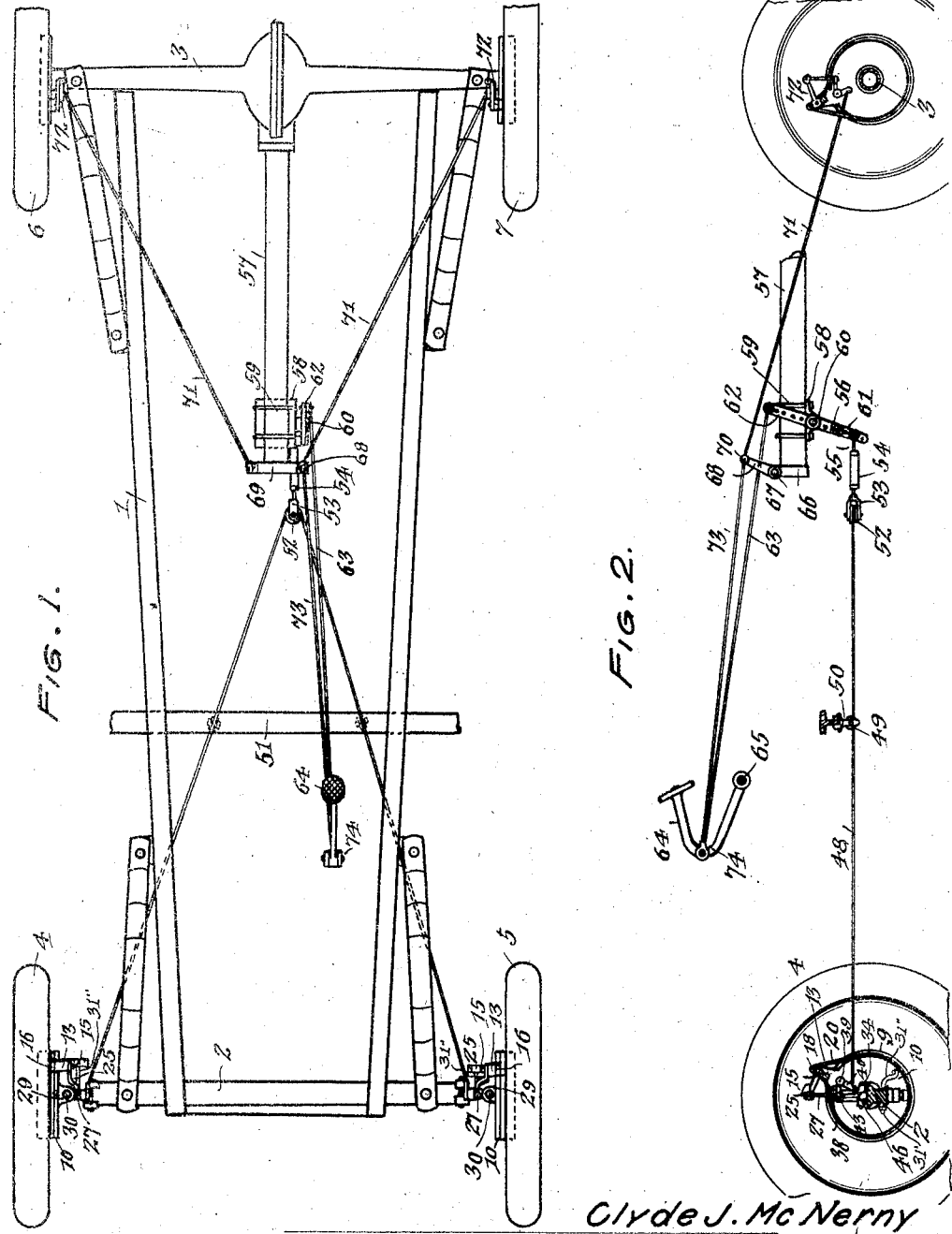
Clyde J. Mc Nerny
INVENTOR.
BY
Geo. P. Kimmel
ATTORNEY.

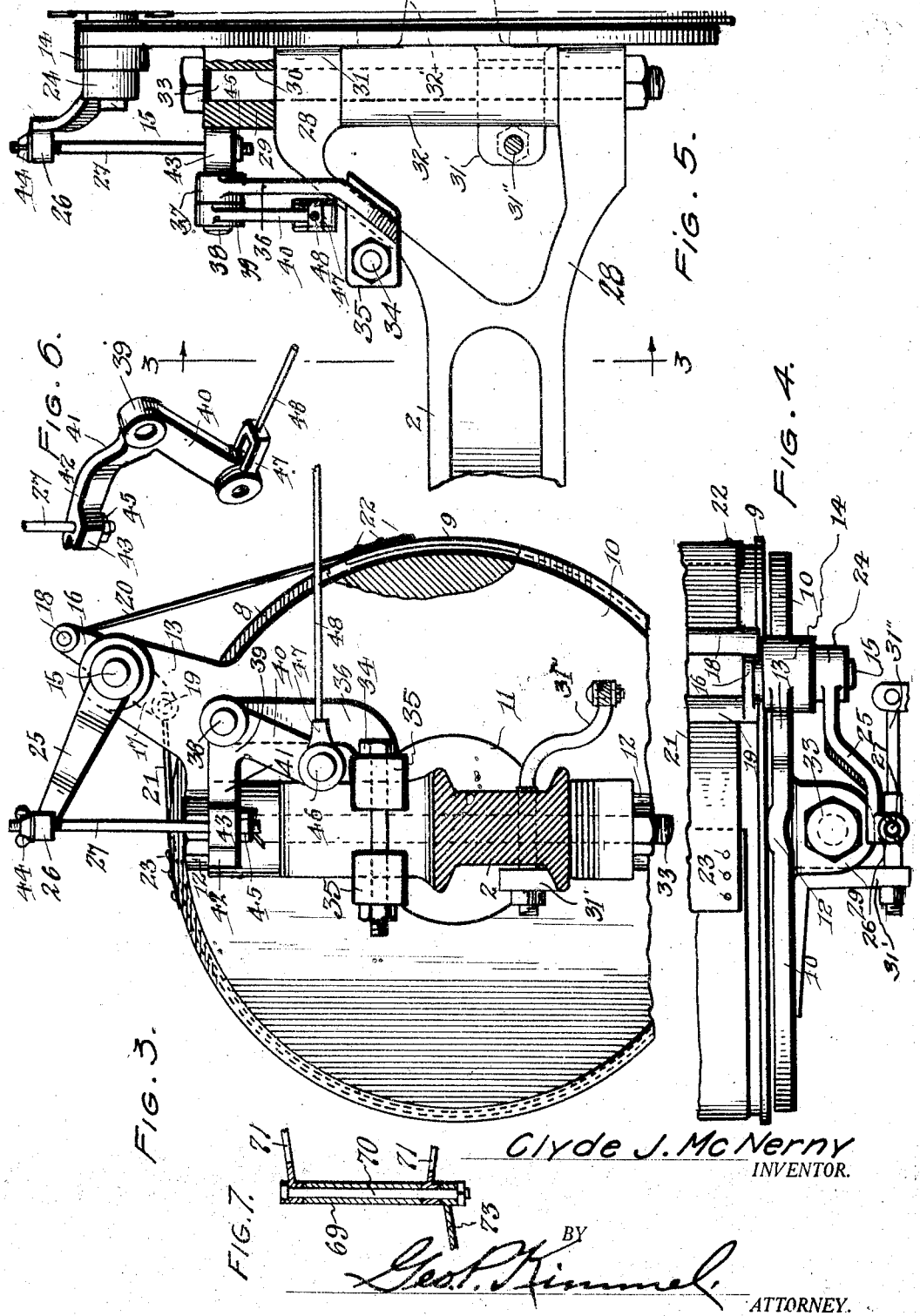

Patented May 19, 1925.

1,538,714

UNITED STATES PATENT OFFICE.

CLYDE J. McNERNY, OF SAN FRANCISCO, CALIFORNIA.

FOUR-WHEEL-BRAKE MECHANISM.

Application filed April 7, 1924. Serial No. 704,809.

*To all whom it may concern:*

Be it known that I, CLYDE J. McNERNY, a citizen of the United States, residing at San Francisco, in the county of San Francisco and State of California, have invented certain new and useful Improvements in Four-Wheel-Brake Mechanism, of which the following is a specification.

This invention relates to a four-wheel brake mechanism for use in connection with motor vehicles, and has for its object to provide, in a manner as hereinafter set forth, a mechanism of such class, to give to the driver of the vehicle a simple, positive and efficient method of control for braking the front and rear wheels of the vehicle simultaneously and furthermore whereby the braking mechanism does not in any manner affect the steering of the vehicle, or when making quick turns and further does not grab or bind on sharp curves, but permits of absolute freedom when operating the steering mechanism of the vehicle under all conditions.

A further object of the invention is to provide, in a manner as hereinafter set forth, a four-wheel braking mechanism including means whereby perfect equalization is had upon the front and rear wheels of the vehicle during the braking operation and furthermore whereby it is impossible for one of the front wheels of the vehicle to grab or bind in turning corners or curves, as an equal pressure is exerted on both front wheels whenever the brake mechanism is applied either on a straight-away or curve.

A further object of the invention is to provide, in a manner as hereinafter set forth, a four-wheel brake mechanism embodying means to simultaneously apply a braking action to the front and rear wheels of the vehicle whereby the stoppage of the vehicle can be had at will, practically without skidding, under such conditions providing for a saving in tires, brake bands, general wear and tear of the vehicle.

Further objects of the invention are to provide a four-wheel brake mechanism, in a manner as hereinafter set forth, which is simple in its construction and arrangement, strong, durable, thoroughly efficient and convenient in its use, readily installed with respect to the vehicle, and comparatively inexpensive.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a top plan view of the chassis and front and rear wheels of a motor vehicle, showing the adaptation therewith of a four-wheel brake mechanism in accordance with this invention.

Figure 2 is a longitudinal sectional view of Figure 1.

Figure 3 is a section on line 3—3, Figure 5.

Figure 4 is a fragmentary view, in plan, of the structure shown in Figure 3.

Figure 5 is a side elevation, partly in section, of the brake band operating mechanism for the front wheels.

Figure 6 is a detail of the brake band operating mechanism.

Figure 7 is a fragmentary view, in section, illustrating the bearing barrel.

Referring to the drawings, 1 denotes the chassis of a motor vehicle, 2 the front axle, 3 the rear axle, 4, 5 the front wheels and 6, 7 the rear wheels. Each of the front and rear wheels is provided with a brake drum 8, having associating therewith a brake band 9. The brake bands 9 of the front wheels are operated simultaneously, the brake bands 9 of the rear wheels are also operated simultaneously, and the brake bands of the front wheels are operated simultaneously with the brake bands of the rear wheels.

With each of the front wheels of the vehicle there is associated a brake band operating mechanism, and as each of these mechanisms is of the same construction but one will be described, as the description of one will apply to the other. Each of said mechanisms consists of a circular plate 10 of substantial thickness and which is formed with a centrally disposed opening 11, of substantial diameter. The plate 10 is set up with a vertically disposed diametrically extending convex portion 12 on the inner face thereof, and said portion 12 is intersected by the opening 11. Projecting from the edge of the plate 10, at the top thereof, to one side of and in proximity to the convex portion, is an inclined supporting arm 13, having the upper end thereof enlarged, as at 14 to provide a bearing for a shaft 15, which projects outwardly and inwardly with respect to the plate 10. The shaft 15 is extended over the drum 8 and is provided with a pair of oppositely extending crank arms 16, 17, carrying right angularly disposed attaching members 18, 19 respectively to which are secured the pulling members 20, 21 respectively. The member 20 is fixedly secured, as at 22, to one end of the brake band 9, and the member 21 is fixedly secured, as at 23, to the other end of the brake band 9. The members 20 and 21 are flexible.

The inner end of the shaft 15 has fixed therewith a collar 24, from which extends an integral offset crank arm 25, provided on the inner side, at the free end thereof, with an apertured enlargement 26 disposed vertically. Connected to the enlargement 26, as well as depending therefrom is a vertically disposed pull rod 27, which is of a length to depend below the edge of the plate 10.

Formed integral with the rear face of the plate 10, and positioned to seat on the top of a forked end 28 of the front axle 2, is a curved enlargement 29, formed with a vertically disposed opening 30.

The convex portion 12 seats against the curved terminal 31 of the tines of the forked end 28 of the axle 2, and by this arrangement the plate 10 shifts against the axle 2 when the front wheel of the vehicle is steered.

The steering knuckle of the vehicle is indicated at 32, and which is pivotally connected by the bolt 33 to the forked end 28 of the axle, and said bolt 33 provides means for pivotally connecting the plate 10 to the said forked end 28 as the bolt 33 extends down through the enlargement 29 and constitutes a pivot therefor. The opening 11 in the plate 10, provides for the passage of the wheel spindle 32'. Formed integral with the knuckle 32 is a bracket 31', to which is connected the steering arm 31''.

Fixedly secured to the forked end 28 of the axle 2, by the holdfast device 34 and positioned to extend rearwardly with respect to the tines of said forked end 28, is a supporting bracket 35, formed with a vertically disposed arm 36, which opposes and is spaced from the enlargement 29. The upper end of the arm 36 is formed with a bearing 37, for supporting the pivot 38, of a bell crank lever 39. One arm of the lever 39 is indicated at 40, and the other arm at 41. The arm 40 depends from the pivot 38, while the arm 41 is disposed at right angles thereto and has its outer portion 42 offset and provided with a vertically disposed apertured enlargement 43 in alignment with the enlargement 26. The pull bar 27 extends down through the enlargements 26 and 43 and is connected with these latter by the securing devices 44, 45, the former abuts against the enlargement 26 and the latter against the enlargement 43.

Pivotally connected, as at 46, to the lower end of the arm 40 of the bell crank lever 39, is a yoke 47, having connected therewith one end of an operating member 48. The other end of the operating member 48 is connected to the yoke 47, carried by the arm 40, of the bell crank lever 39 of the other brake band operating mechanism.

The member 48 is a cable of substantial length and travels against a pair of pulleys 49, carried by brackets 50, supported from the cross bar 51 of the chassis. The member 48 further travels over a pulley 52, carried by a yoke 53 adjustably connected to a turn buckle 54 and to the latter is adjustably connected a stem 55 for connection with a pulling lever 56.

The drive shaft housing of the vehicle is indicated at 57, and secured therewith is a plate 58. Yoke-shaped elements 59 are employed for fixedly securing the plate 58 to the drive shaft housing. The plate 58 is provided with a pivot 60, upon which is secured the pull lever 56. Below the pivot 60, the lever 56 is provided with a series of openings 61 for adjustably connecting the stem 55 therewith. Above the pivot 60 the lever 59 is provided with a series of openings 62 for the purpose of adjustably connecting therewith an operating member 63, for the lever 56, and said operating member 63 is connected to the brake lever 64 of the vehicle, and at a point intermediate the ends thereof. The pivot of the lever 64 is indicated at 65.

Secured to the drive shaft housing 57, at the forward end thereof, by a collar 66 or other suitable means, is the pivot 67, of a pull lever 68. The upper end of the lever 68 is provided with a barrel 69 through which extends a bar 70, having connected to each of its ends an operating member 71, and each of the members 71 is provided for operating a brake band shifting mechanism 72 for a rear wheel, and such brake band shifting mechanism is of known construction. Connected to one end of the bar 70, is an operating member 73 for the pull lever 68, and which is connected to the brake lever 64 at the same point at which the member 63 is attached, as indicated at 74.

The brake mechanisms for the rear wheels may be constructed in the same manner as the brake mechanisms for the front wheels, but if the brake mechanisms for the rear wheels are similar to the brake mechanisms for the front wheels, the plate 10 of the rear mechanisms is not formed with a concave portion and is fixed in position.

The pull rod 27 is fixed to the crank arm 25 and is loosely connected to the arm 41 of the bell crank lever 39, so as to permit of the shifting of the plate 10, or rather rocking of the plate 10, against the forked end of the axle 2 when the wheel is steered as the plate 10 is mounted to shift with the wheel. When the operating member 48 is shifted in a forward direction, when the brake lever 64 is shifted to apply the brakes, the arm 40 of the bell crank lever 39 moves rearwardly which lowers the arm 41, carrying the pull rod 27 therewith, and as the latter is connected to the arm 25, the latter will be lowered whereby the shaft 15 will be rocked and the cranks 16 and 17 shifted from the position as shown in Figure 3, so that the band 9 will be applied to the drum 8 for braking purposes. The rearward shifting of the member 48 is had through the medium of the pull lever 56, which is connected by the member 63 to the brake lever 64. Simultaneously with the operation of the member 63, the member 73 will also be operated by the brake lever 64, and on the operation of the member 73, the pull lever 68 will be moved forwardly, carrying the members 71 therewith and applying the brakes upon the rear wheels of the vehicle.

When the brake lever is applied, the upper ends of the levers 56 and 68 will be moved forwardly whereby the operating members 48 and 71 will cause the simultaneous application of the brakes to the front and rear wheels, and the said operating members 48 and 71 each acting on a bell crank lever 39 will provide for the operation of each wheel brake mechanism in a manner as set forth in the preceding paragraph.

It is thought that the many advantages of a four-wheel brake mechanism, in accordance with this invention, can be readily understood, and although the preferred embodiment of the invention is as illustrated and described, yet changes in the details of construction can be had which will fall within the scope of the invention as claimed.

What I claim is:—

1. In a four-wheel brake mechanism for vehicles, a brake band applying device for each of the wheels of the vehicle, an operating member having its ends connected to the devices for the front wheels, a pair of operating members connected to the devices of the rear wheels, a pull lever having one end connected with the operating member for the front wheel devices, a pull lever connected to the operating members for the rear wheel devices, a pair of operating elements, one connected to that lever to which the operating members for the rear wheel devices are attached and the other of said elements connected to the other end of the pull lever to which the operating member for the front wheel devices is connected, and means for simultaneously operating said elements.

2. In a four-wheel brake mechanism for vehicles, a brake band applying device for each of the wheels of the vehicle, an operating member having its ends connected to the devices for the front wheels, a pair of operating members connected to the devices of the rear wheels, a pull lever having one end connected with the operating member for the front wheel devices, a pull lever connected to the operating members for the rear wheel devices, a pair of operating elements, one connected to that lever to which the operating members for the rear wheel devices are attached and the other of said elements connected to the other end of the pull lever to which the operating member for the front wheel devices is connected, means for simultaneously operating said elements, and means for connecting said pull levers with the drive shaft housing of the vehicle.

3. In a four-wheel brake mechanism for vehicles, a brake band applying device for each of the wheels of the vehicle, an operating member having its ends connected to the devices for the front wheels, a pair of operating members connected to the devices of the rear wheels, a pull lever having one end connected with the operating member for the front wheel devices, a pull lever connected to the operating members for the rear wheel devices, a pair of operating elements, one connected to that lever to which the operating members for the rear wheel devices are attached and the other of said elements connected to the other end of the pull lever to which the operating member for the front wheel devices is connected, means for simultaneously operating said elements, and means for adjustably connecting the operating member for the front wheel devices with its pull lever.

4. In a four-wheel brake mechanism for vehicles, a brake band applying device for each of the wheels of the vehicle, an operating member having its ends connected to the devices for the front wheels, a pair of operating members connected to the devices of the rear wheels, a pull lever having one end connected with the operating member for the front wheel devices, a pull lever connected to the operating members for the rear wheel devices, a pair of operating elements, one connected to that lever to which the operating members for the rear wheel devices are attached and the other of said elements connected to the other end of the pull lever to which the operating member for the front wheel devices is connected, means for simultaneously operating said elements, means for adjustably connecting the operating member for the front wheel devices with its pull lever, and means for adjustably connecting the pull lever for the operating member for the front wheel devices, to its respective operating element.

5. In a four-wheel brake mechanism for vehicles, a brake band applying device for each of the wheels of the vehicle, an operating member having its ends connected to the devices for the front wheels, a pair of operating members connected to the devices of the rear wheels, a pull lever having one end connected with the operating member for the front wheel devices, a pull lever connected to the operating members for the rear wheel devices, a pair of operating elements, one connected to that lever to which the operating members for the rear wheel devices are attached and the other of said elements connected to the other end of the pull lever to which the operating member for the front wheel devices is connected, means for simultaneously operating said elements, means for adjustably connecting the operating member for the front wheel devices with its pull lever, means for adjustably connecting the pull lever for the operating member for the front wheel devices, to its respective operating element and means for pivotally supporting said pull levers from the drive shaft housing of the vehicle.

In testimony whereof, I affix my signature hereto.

CLYDE J. McNERNY.